United States Patent Office 3,410,836
Patented Nov. 12, 1968

3,410,836
POLYMERIZATION OF CONJUGATED DIENES WITH A DILITHIUM COMPLEX OF AN AROMATIC KETONE
Henry L. Hsieh and William J. Trepka, Bartlesville, Okla., assignors to Phillips Petroleum Company, a corporation of Delaware
No Drawing. Filed Mar. 9, 1964, Ser. No. 350,601
11 Claims. (Cl. 260—83.7)

ABSTRACT OF THE DISCLOSURE

Polymers of conjugated dienes containing terminal hydroxy groups are made with a dilithium complex of an aromatic ketone followed by treating the polymer to remove the lithium atoms.

This invention relates to the polymerization of vinylidene-containing monomers. In another aspect it relates to a process for preparing polymers which contain reactive groups.

It is known that reactive polymers can be made by polymerizing conjugated dienes with an organo-alkali metal initiator and terminating the polymerization in such a way that the alkali metal atoms present in the polymer are replaced by reactive groups. For example, butadiene can be polymerized in a hydrocarbon diluent with an initiator such as 1,4-dilithiobutane and when the monomer has been consumed the polymerization mixture reacted with carbon dioxide and then with a proton donor, such as an alcohol or an acid, to produce a polymer containing carboxy groups. Because of the progress of the polymerization reaction mechanism as it is now understood, the reactive groups are positioned terminally on the polymer chain. In this way a polymer containing a carboxy group on each end of the molecule can be prepared and such polymers have been called, for the sake of convenience, "telechelic" polymers or, in this specific instance, "carboxy-telechelic polybutadiene." Using the same terminology, a polymer having a reactive group on only one end of the polymer chain would be a "semi-telechelic" polymer.

Telechelic and semi-telechelic polymers, as above described, are very useful because they can be cured by reacting them with a variety of polyfunctional compounds. For example, the carboxy-containing polymers can be coupled with polyisocyanates or with polyhydroxy alcohols. Liquid or semi-solid polymers can very readily be converted into solid products under conveniently controlled conditions. In preparing polymers which are capable of coupling or crosslinking with polyfunctional compounds, it is frequently desirable that more than one kind of reactive group be present in the polymer so that the coupling reactions can be effected in stages or so that a wider selection of coupling compounds is possible. Difficulties are often encountered in preserving the terminally positioned alkali metal atom in the polymer until it can be replaced with a reactive group. Any impurity in the reaction mixture which can contribute a hydrogen ion tends to reduce the functionality of the final product so that the theoretical ideal of each polymer molecule containing two reactive end groups is not achieved.

We have discovered that polymers of increased functionality or polymers containing different functional groups can be made by using an initiator of a specific type. According to our invention, reactive polymers are prepared by contacting a vinylidene-containing monomer under polymerization conditions with a dilithium complex of an aromatic ketone and treating the polymer formed to remove the lithium atoms. We have found that an aromatic ketone when reacted with lithium metal in an etheral solvent forms a complex in which one of the lithium atoms is bonded to the oxygen of the ketone and another lithium atom is bonded to the ketyl carbon. We have concluded that the initiator itself becomes a part of the polymer and that polymer growth takes place only at the carbon-lithium bond because when the polymer is recovered in a conventional manner with an alcohol or acid, thereby replacing any lithium present in the polymer with hydrogen atoms, the polymer which results contains hydroxy groups. It was quite surprising that the dilithium complex should behave in this fashion because the reaction product of sodium and aromatic ketones polymerizes a vinylidene-containing monomer by a free radical mechanism with no indication of achieving the results obtained in the present invention.

It is an object of our invention to provide a method of polymerizing vinylidene-containing monomers. Another object is to provide a method of preparing a polymer which contains a hydroxy radical. Another object is to provide a method of preparing polymers of mixed functionality. Still another object of our invention is to provide a method of forming polymers which can be coupled and cured by reactions with polyfunctional organic compounds. Other objects, advantages, and features of our invention will be apparent to those skilled in the art from the following discussion.

The polymerization initiators which are used in this invention are the dilithium complexes of aromatic ketones and are formed by reacting lithium metal in the form of wire, chunks, or the like with an aromatic ketone in an etheral solvent. Suitable solvents include diethyl ether and diisopropyl ether, tetrahydrofuran, dioxane, or the like or mixtures of such ethers. The aromatic ketones are preferably hydrocarbon except for the oxygen of the carbonyl group and can contain up to 50 carbon atoms in the molecule. The preferred aromatic ketones are represented by the formula

in which R and R′ are each a phenyl radical, a 1-naphthyl radical, a 2-naphthyl radical, or such radicals which contain substituents inert with respect to the lithium. Ordinarily any substituents should be hydrocarbons and preferably are lower alkyls, that is, alkyl groups having from 1 to 4 carbon atoms. We further prefer that no more than three such substituents be attached to each R or R′ group.

Examples of such aromatic ketones represented by the formula given above include benzophenone, phenyl 1-naphthyl ketone, di-2-naphthyl ketone, di-4-tolyl ketone, di-4-isobutylphenyl ketone, di-2,4,6-trimethylphenyl ketone, 4-methyl-7-ethyl-1-naphthyl 2-methyl-6-propyl-1-naphthyl ketone, di-4,5,7-tri-n-butyl-2-naphthyl ketone, 2-ethyl-5-propylphenyl 6-methyl-2-naphthyl ketone, and the like.

In preparing the initiators an excess of lithium is used and the temperature is normally in the range of −50 to 150° C., preferably from 0 to 100° C. Room temperature is satisfactory. The initiator which is formed by this reaction can be represented by the formula

in which R and R′ are as previously defined. In the polymerization reaction the polymer growth occurs at the carbon-lithium bond while the —OLi group in the initiator remains unchanged. During the recovery procedures in which the polymer is contacted with a proton donor, the lithium atom of the —OLi group is replaced with hydrogen, thereby resulting in the formation of a hydroxy group which is attached to the carbon atom which was bonded to the oxygen in the ketone.

The monomers which can be polymerized by the initiators described herein are those which contain a vinylidene group which is attached to a carbon atom multiply bonded to another atom. Normally these monomers will not contain over 30 carbon atoms per molecule and will be hydrocarbons except that the monomers can contain a halogen, oxygen or nitrogen atom but are free from reactive hydrogen atoms. We prefer to use conjugated dienes containing 4 to 12 carbon atoms and more preferably 4 to 8 carbon atoms per molecule. Examples of such conjugated dienes include 1,3-butadiene, isoprene, 2,3-dimethyl-1,3-butadiene, piperylene, 3-butyl-1,3-octadiene, 2-phenyl-1,3-butadiene and the like. Conjugated dienes containing halogen and alkoxy substituents such as chloroprene and 2-methoxy-1,3-butadiene can be used. The conjugated dienes can be formed into homopolymers or copolymers including block copolymers prepared by charging the monomers sequentially.

Also included among the vinylidene-containing monomers are the vinyl-substituted aromatic compounds such as styrene, 1-vinylnaphthalene, 2-vinylnaphthalene and the alkyl, cycloalkyl, aryl, alkaryl, aralkyl, alkoxy, aryloxy, and dialkylamino derivatives thereof in which the total number of the carbon atoms in the combined substituents does not exceed 12. Examples include 3-methylstyrene, 4-dodecylstyrene, 4-cyclohexylstyrene, 2-ethyl-4-benzylstyrene, 4-methoxystyrene, 4-dimethylaminostyrene, 3,5-diphenoxystyrene, 4-p-tolylstyrene, 4-phenylstyrene, 4,5-dimethyl-1-vinylnaphthalene, 3-n-propyl-2-vinylnaphthalene, and the like. These vinyl-substituted aromatic compounds can be used to form homopolymers or copolymers including block copolymers with each other or with conjugated dienes.

In addition, certain polar monomers can be polymerized to form homopolymers or copolymers with each other or copolymerized with conjugated dienes and/or vinyl-substituted aromatic compounds. Block copolymers of these monomers can be prepared by introducing the polar monomer after the non-polar monomer has polymerized. These include the vinylpyridines and the vinylquinolines in which the vinyl group is attached to a ring carbon other than a carbon in the beta position with respect to the nitrogen. Examples are the vinyl-substituted pyridine, quinoline or isoquinoline derivatives corresponding to those described in connection with the vinyl-substituted aromatic compounds. Examples include 2-vinylpyridine, 5-cyclohexyl-2-vinylpyridine, 6-methoxy-2-vinylpyridine, 3-benzyl-4-vinylpyridine, 4-phenyl-2-vinylpyridine, 4-dimethylamino-2-vinylquinoline, 3-vinylisoquinoline and the like. Other polar monomers include methyl acrylate, ethyl acrylate, methyl methacrylate, butyl methacrylate, acrylonitrile, methacrylonitrile, N,N-dimethylacrylamide, and similar acrylic and alkacrylic acid esters, nitriles and N,N-disubstituted amides.

The polymerizations are preferably carried out in predominantly hydrocarbon liquid diluents although ether solvents such as those used in the initiator preparation can also be used. We have found that when using the preferred hydrocarbon diluents, however, that substantially higher conversions of monomer to polymer can be obtained. Suitable hydrocarbon diluents include benzene, toluene, cyclohexane, methylcyclohexane, xylene, n-butane, n-hexane, n-heptane, isooctane, n-decane, and similar paraffins, cycloparaffins or aromatics containing about 4 to 10 carbon atoms per molecule.

The polymerization temperature is normally in the range of about −100 to +150° C. and the preferred temperature range is between −75 and +75° C. The most desirable temperature depends upon the specific monomers and initiator used in the polymerization. In general the lower temperatures are desired when using an ether diluent or when polar monomers are polymerized. The amount of initiator can vary considerably but is normally in the range of about 0.5 to 200 millimoles per 100 grams of monomer. The preferred range for initiator level is from 1 to 150 millimoles per 100 grams of monomer. The polymerization mixture should be agitated and the reaction time can extend from a few minutes to 100 hours or more. Usually a short induction period is required. Conversions can be expected to be nearly quantitative when using a hydrocarbon diluent. At the end of the reaction the initiator can be inactivated and the polymer coagulated by adding an acid or alcohol. The polymer is then separated, washed and dried using conventional recovery techniques.

When the polymer is directly recovered by treating with a proton donor such as water, an alcohol or acid, the polymer recovered contains a single hydroxy group on or near one end of the polymer molecule. The proximity of this hydroxy group to the end of the polymer molecule depends upon the size of the R or R' group in the aromatic ketone. When these groups are unsubstituted or lower alkyl-substituted aryl groups, this hydroxy group can be considered terminal. Prior to termination of the polymerization with a proton donor, a reactive lithium atom is present at the other end of the polymer chain and can be replaced with a functional group by treating the polymer with a suitable reagent. Otherwise, on reaction with an acid or alcohol this lithium is replaced with hydrogen which is not considered reactive. By treating the unterminated polymer with carbon dioxide, for example, and then removing the lithium atoms with a proton donor, the final polymer contains two types of terminal groups, a hydroxy group near one end of the polymer chain and a carboxy group on the other end. This polymer is capable of a number of different types of reactions.

The hydroxy-carboxy terminated polymer can be reacted with itself in an esterification between the hydroxy and carboxy groups. On the other hand, a bifunctional treating compound can be used to couple the polymer molecules via the carboxy groups to produce a product which is a hydroxy-telechelic polymer, that is, a polymer having a hydroxy group near each end of the molecular chain. Such coupling reactions can also occur with the lithium-terminated polymer. In this case an excess of treating agent tends to minimize coupling and terminate the polymer chains with a reactive group while using less than a stoichiometric amount of treating agent results in coupling the polymer molecules to produce the hydroxy-containing polymer. Treating agents which contain three or more functional groups that will react with the carbon-lithium bond of the polymer can be used to produce polymers having long chain branches. Such polymers are referred to as radial polymers and in this case each polymer branch contains a hydroxy group. In certain cases when using a polyfunctional treating agent some of the reactive groups will couple the polymer while others remain unreacted so that the product obtained contains one or more functional groups along the polymer chain as well as at or near the treminal positions. The treating agent can also be of such nature that it provides more than one kind of reactive group per chain end.

In order to introduce functional groups in the polymer in place of the lithium atom bonded to a carbon atom, it is necessary to treat the polymer solution before inactivating the initiator with water, alcohol or acid. The polymer solution can be treated with carbon dioxide to introduce carboxy groups, with a cyclic disulfide or sulfur to introduce mercapto groups, with aldehydes, ketones or epoxy compounds such as acetaldehyde, acetone or ethylene oxide to introduce hydroxy groups, with carbon disulfide to introduce carbodithio groups, and the like. It is ordinarily necessary to remove the lithium atoms from the salt which forms in the termination reaction by hydrolysis using alcohol, acid or water.

The polymer can be coupled while it still contains an active terminal lithium atom by selection of the type and amount of terminating agent used. For example, carbon dioxide, depending upon the amount used, can either couple the polymer or terminate it with carboxy groups. Also the polymer containing terminal reactive groups can be coupled by reaction with a polyfunctional compound. For example, a diisocyanate can be used to couple a polymer containing terminal hydroxy groups or a polyaziridinyl compound to couple a carboxy-terminated polymer.

The polymer can also be coupled with reagents such as those described in the patent to Zelinski and Hsieh, U.S. 3,078,254, which issued Feb. 19, 1963. Other coupling reagents which can be used include ethyl maleate, 2,5-hexanedione, tetramethyl thiuram monosulfide, adiponitrile, sebaconitrile, and the like. These and other coupling agents can be used alone or in conjunction with conventional rubber curatives such as sulfur.

In order to illustrate further the advantages of our invention the following examples are presented. The conditions, reactants and proportions in these examples are typical only and should not be construed to limit our invention unduly.

EXAMPLE I

Benzophenone was reacted with an excess of lithium in tetrahydrofuran. Lithium wire (0.27 g. atom), benzophenone (0.055 mole), and dried solvent were charged to a reactor which was then pressured to 20 p.s.i. with nitrogen. The reaction mixture was agitated for 24 hours while the temperature was maintained at 86° F. A quantitative yield of dilithium complex of benzophenone was obtained (determined as total alkalinity by acid titration of 2-ml. aliquots).

Two runs were made for the polymerization of butadiene using the dilithium complex of benzophenone prepared as described above. Polymerizations were carried out using both toluene and diethyl ether as diluents. The diluent was charged first, the reactor was purged with nitrogen, butadiene was added, and then the initiator. The following recipes were used:

|  | Recipe | |
|---|---|---|
|  | A | B |
| 1,3-butadiene, parts by weight | 100 | 100 |
| Toluene, parts by weight | 860 |  |
| Diethyl ether, parts by weight |  | 714 |
| Initiator level, m.h.m.[1] | 20 | 20 |

[1] Gram millimoles per 100 grams of monomer.

Each of the unquenched reaction mixtures was carbonated by contacting the polymer solutions with an excess of carbon dioxide. The materials which formed set up as solid gels. The polymers were recovered by treating with HCl and removing the diluent. Results of the runs are presented in the following table:

TABLE I

| Run No. | Recipe | Temperature, °F. | Time, hours | Conversion, percent | Inherent Viscosity | COOH, percent |
|---|---|---|---|---|---|---|
| 1 | A | 122 | 0.5 | 100 | 0.36 | 0.49 |
| 2 | B | 41 | 6 | 87 | 0.30 | 0.53 |

The polymer formed contained both carboxy and hydroxy groups.

The presence of hydroxy groups in a polymer formed by initiating the polymerization of 1,3-butadiene with the reaction product of lithium and benzophenone has been established by infrared analysis. A strong absorption at 2.85 microns, indicating the presence of the hydroxy group, can be observed in the polymer from which the lithium has been removed and replaced with hydrogen. For this analysis, polymers made with a high initiator level should be used in order to obtain a strong infrared indication. This polymer would be a hydroxy semi-telechelic polybutadiene.

EXAMPLE II

The initiator prepared as described in Example I was employed for the production of a butadiene/styrene block copolymer. The following recipe was used:

| 1,3-butadiene, parts by weight | 70 |
|---|---|
| Styrene, parts by weight | 30 |
| Toluene, parts by weight | 860 |
| Initiator, m.h.m. | 6 |
| Temperature, °F. | 122 |

Toluene was charged first, the reactor was purged with nitrogen, butadiene was added, and then the initiator. Butadiene was allowed to polymerize for 0.5 hour. The styrene was then introduced and allowed to polymerize for 3 hours. Quantitative conversion of the monomers was obtained. The product had an inherent viscosity of 0.96 and a refractive index at 25° C. of 1.5341.

EXAMPLE III

Butadiene was polymerized at 122° F. using 100 parts by weight of 1,3-butadiene, 780 parts by weight of cyclohexane, and 10 m.h.m. of the initiator prepared as described in Example I. After the reaction had proceeded for 0.5 hour, 30 percent of the polymer was removed and coagulated. The remaining polymer was treated with 7 m.h.m. of bis(chloromethyl) ether. Polymerization temperature was maintained for two additional hours while the mixture was agitated. Both the untreated and treated portions of polymer were coagulated with alcohol, separated, and dried. Inherent viscosity was determined on both products. Results were as follows:

TABLE II

| Run: | Inherent viscosity |
|---|---|
| 1 (control) | 0.59 |
| 2 | 0.76 |

The increase in inherent viscosity indicates that coupling occurred when the polymer was treated with the bis(chloromethyl) ether to give a hydroxy-telechelic polymer.

EXAMPLE IV

A dilithium complex of benzophenone was prepared by reacting an excess of lithium wire with benzophenone using a 9/1 volume mixture of diethyl ether and tetrahydrofuran as the diluent. The following recipe was used:

| Benzophenone, mole | 0.11 |
|---|---|
| Lithium wire, gram atom | 0.54 |
| Diethyl ether, ml. | 180 |
| Tetrahydrofuran, ml. | 20 |

The mixture was agitated at 122° F. for one hour. Total alkalinity, determined by acid titration of an aliquot, was 1.06 N. This material was used as the initiator for the polymerization of butadiene in accordance with the following recipe:

| 1,3-butadiene, parts by weight | 100 |
|---|---|
| Toluene, parts by weight | 860 |
| Initiator, m.h.m. | 52 |
| Temperature, °F. | 122 |
| Time, hours | 1 |
| Conversion, percent | 100 |

Two runs were made for the production of liquid polymers. The first was shortstopped with HCl-acidified isopropyl alcohol. The second was shortstopped with 100 milliequivalents per 100 grams of monomer of a liquid epoxidized polybutadiene after which HCl-acidified isopropyl alcohol was added. Both mixtures were washed with water and dried to recover the liquid polymers.

Each of the polymers was treated with 10 p.h.m. (parts by weight per 100 parts monomer charged to the polymerization) of tolylene-2,4-diisocyanate for 72 hours at 160° F. Determination of the original and final inherent viscosity and gel content of each product gave the following results:

TABLE III

| Run | Original | | Final | |
|---|---|---|---|---|
| | Inh. Visc. | Gel, Percent | Inh. Visc. | Gel, Percent |
| 1 (control) | 0.27 | 0 | 0.28 | 1 |
| 2 | 0.32 | 0 | | 75 |

The polymer from Run 1 was a hydroxy-semitelechelic polymer. Coupling with the isocyanate resulted in a small change in inherent viscosity and a little gel. In Run 2 the polyfunctional shortstop caused coupling but some functional groups in the reagent remained unreacted. These groups and the terminal hydroxy groups then reacted with the diisocyanate to produce a network structure (crosslinking), evidenced by the gel content of the product.

The liquid-epoxidized polybutadiene is a commercial product of Food Machinery and Chemical Corporation designated as Oxiron 2000. It is a pale amber liquid having a viscosity of 1800 poises at 25° C., a specific gravity of 1.010, and an aliphatic hydrocarbon chain as a backbone to which is attached a multiplicity of epoxy groups, the epoxy content being 9.0 percent (oxirane oxygen). The epoxy equivalent (number of grams of resin containing one gram mole of epoxide) is 177.

Inherent viscosity and percent gel were determined as follows: One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

As will be apparent to those skilled in the art, various modifications can be made in this invention without departing from the spirit or scope thereof.

We claim:

1. A method of preparing a reactive polymer which comprises contacting (1) at least one monomer selected from the group consisting of conjugated dienes containing from 4 to 12 carbon atoms and vinyl-substituted aromatic compounds containing from 8 to 20 carbon atoms with (2) a dilithium complex of an aromatic ketone having the formula $$\begin{array}{c} \text{O Li} \\ | \\ \text{R}-\text{C}-\text{R} \\ | \\ \text{Li} \end{array}$$

wherein each R is selected from the group consisting of phenyl radical, a 1-naphthyl radical, a 2-naphthyl radical, and said radicals containing up to 3 lower alkyl substituents, under polymerization conditions, and treating polymer formed with proton donor to remove the lithium toms and produce a polymer having terminal hydroxy groups.

2. A method of preparing a polymer containing terminal hydroxy groups which comprises contacting a conjugated diene having 4 to 8 carbon atoms under polymerization conditions with an initiator having the formula $$\begin{array}{c} \text{O Li} \\ | \\ \text{R}-\text{C}-\text{R} \\ | \\ \text{Li} \end{array}$$

wherein each R is selected from the group consisting of a phenyl radical, a 1-naphthyl radical, a 2-naphthyl radical, and said radicals containing up to 3 lower alkyl substituents, and treating polymer formed with a proton donor to remove the lithium atoms.

3. The method of claim 2 wherein said polymer formed is treated sequentially with carbon dioxide and a proton donor, thereby producing a carboxy-hydroxy terminated polymer.

4. The method of claim 2 wherein said polymer formed is treated sequentially with an epoxy compound and a proton donor, thereby producing a hydroxy-telechelic polymer.

5. The method of claim 2 wherein said polymer formed is treated with a polyfunctional coupling agent reactive with the carbon-lithium bond and then with a proton donor, thereby producing a hydroxy-telechelic polymer.

6. A method of making a terminally reactive polymer which comprises contacting 1,3-butadiene under polymerization conditions with a dilithium complex of benzophenone, having the formula

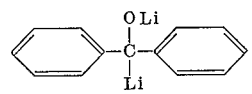

and treating polymer formed with a proton donor to remove the lithium atoms and form a polymer having terminal hydroxy groups.

7. The method of claim 6 wherein said polymer formed is carbonated with carbon dioxide.

8. The method of claim 6 wherein said polymer formed is reacted with bis(chloromethyl) ether.

9. The method of claim 6 wherein said polymer formed is reacted with liquid epoxidized polybutadiene.

10. The method of claim 6 wherein styrene is polymerized in addition to the 1,3-butadiene to form said polymer.

11. A method of preparing a polymer containing a terminal hydroxy group per molecule which comprises contacting 1,3-butadiene in a predominantly hydrocarbon, inert, liquid diluent at a temperature in the range of about 0 to 100° C. with an initiator composition having the formula

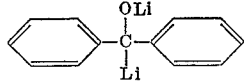

made by reacting lithium and benzophenone in etheral solvent, and recovering the polymer which forms using at least one reagent which supplies hydrogen ions to replace lithium present in the polymer.

References Cited

UNITED STATES PATENTS

| | | | |
|---|---|---|---|
| 2,856,391 | 10/1958 | Diem | 260—94.2 |
| 3,041,312 | 6/1962 | Boyd | 260—94.2 |
| 3,078,254 | 2/1963 | Zelinski et al. | 260—93.5 |
| 3,135,716 | 6/1964 | Uraneck et al. | 260—93.5 |
| 3,175,997 | 3/1965 | Hsieh | 260—94.2 |
| 3,254,062 | 5/1966 | Norman | 260—94.2 |

OTHER REFERENCES

Chemical Abstracts, vol. 53, 1959, p. 23102.

JOSEPH L. SCHOFER, *Primary Examiner.*

J. C. HAIGHT, *Assistant Examiner.*